(12) United States Patent
Montgomery

(10) Patent No.: US 7,876,430 B2
(45) Date of Patent: Jan. 25, 2011

(54) LASER SCANNING FOR MOORING ROBOT

(75) Inventor: Peter James Montgomery, Christchurch (NZ)

(73) Assignee: Cavotec MSL Holdings Limited, Christchurch (NZ)

( * ) Notice: Subject to any disclaimer, the term of this patent is extended or adjusted under 35 U.S.C. 154(b) by 526 days.

(21) Appl. No.: 11/631,104

(22) PCT Filed: Jun. 24, 2005

(86) PCT No.: PCT/NZ2005/000144
§ 371 (c)(1),
(2), (4) Date: Apr. 10, 2008

(87) PCT Pub. No.: WO2006/001720
PCT Pub. Date: Jan. 5, 2006

(65) Prior Publication Data
US 2008/0289558 A1     Nov. 27, 2008

(30) Foreign Application Priority Data
Jun. 29, 2004   (NZ) ..................... 533858

(51) Int. Cl.
*G01C 1/00*   (2006.01)
*G01B 11/14*   (2006.01)
(52) U.S. Cl. ..................... 356/141.1; 356/622
(58) Field of Classification Search .............. 356/141.1, 356/141.5, 614, 622
See application file for complete search history.

(56) References Cited

U.S. PATENT DOCUMENTS

| | | | |
|---|---|---|---|
| 3,503,680 A | 3/1970 | Schenkerman | 356/5 |
| 3,594,716 A | 7/1971 | Waterman | 367/91 |
| 3,690,767 A * | 9/1972 | Missio et al. | 356/5.08 |
| 3,707,717 A | 12/1972 | Frielinghaus | 342/23 |
| 3,754,247 A | 8/1973 | Hansford | 342/23 |
| 4,055,137 A | 10/1977 | Motai | |
| 4,063,240 A | 12/1977 | Isbister et al. | 342/21 |
| 4,293,857 A | 10/1981 | Baldwin | 342/32 |
| 4,340,936 A | 7/1982 | Mounce | 701/200 |
| 5,274,378 A | 12/1993 | O'Conner | 342/23 |
| 5,432,515 A | 7/1995 | O'Conner | 342/23 |
| 5,969,665 A | 10/1999 | Yufa | 341/41 |
| 6,023,665 A | 2/2000 | Millgard | 702/151 |
| 6,677,889 B2 | 1/2004 | Van Rees et al. | 342/41 |
| 6,707,414 B2 * | 3/2004 | Van Rees et al. | 342/23 |

FOREIGN PATENT DOCUMENTS

DE    4301637 A1    8/1994

(Continued)

OTHER PUBLICATIONS

Marimatech Brochure, When it's all About Getting the Right Signal, A Wave of Useful Products, 4 pages.

*Primary Examiner*—Isam Alsomiri
(74) *Attorney, Agent, or Firm*—Jacobson Holman PLLC

(57) ABSTRACT

A profile scanner for locating a target zone on a profile of a vessel comprising an emitter adapted to progressively or instantaneously radiate towards the vessel; a receiver providing a signal indicative of radiation incident thereon; a controller or processor including stored instructions, for energizing the emitter and receiving the signal, and adapted to determine the vertical location of the target zone relative to scanner.

19 Claims, 2 Drawing Sheets

FOREIGN PATENT DOCUMENTS

| | | |
|---|---|---|
| JP | 60-187873 | 9/1985 |
| JP | 02-049184 | 2/1990 |
| JP | 02-290576 | 11/1990 |
| JP | 02-292540 | 12/1990 |
| JP | 04-303706 | 10/1992 |
| JP | 2000292540 A * | 10/2000 |
| WO | WO 9612265 A1 * | 4/1996 |

* cited by examiner

LASER SCANNING FOR MOORING ROBOT

This is a national stage of PCT/NZ05/000,144 filed Jun. 24, 2005 and published in English.

FIELD OF THE INVENTION

The present invention relates to profile scanning for locating an attachment zone of a vessel for attaching a mooring robot to the vessel.

BACKGROUND ART

Various systems are known in the art for assisting with the traditionally manual procedure of docking a vessel for loading and unloading. For example, Japanese Patent Publication No. 2000292540 describes a system to provide such a means that can measure the berthing speed of a vessel by automatically detecting the vessel, at a low cost with a relatively simple constitution. A laser sensor installed to a quay is mounted on a turntable for controlling the direction of the sensor and, at the time of scanning, the turntable changes the angle of the sensor in the vertical direction within the laser beam axis moving range between a laser beam irradiation axis along which the position of a vessel can be detected at high tide and another laser beam irradiation axis along which the position of the vessel can be detected at low tide so that the sensor may detect the vessel by changing the laser beam irradiation axis of the sensor even when the position of the vessel changes in the vertical direction. Then the berthing speed of the vessel is measured by fixing the laser beam irradiation axis at the position at which the sensor detects the vessel. When the measurement is omitted while the vessel comes alongside the quay, the position of the vessel is detected by again moving the sensor.

In a further example U.S. Pat. No. 6,023,665 describes a system for detecting, identifying and docking aircraft using laser pulses to obtain a profile of an object in the distance. The system initially scans the area in front of the gate until it locates and identifies an object. Once the identity of the object is known, the system tracks the object. By using the information from the profile, the system can in real time display the type of airplane, the distance from the stopping point and the lateral position of the airplane.

In still a further example Japanese Patent Publication No. 4303706 describes a system to detect the position of a ship which is changed by the ebb and flow of tide and the amount of unloading of bulk material in the unloading work of the ship in real time without contact and without much effort. A laser range finder is attached to cargo handling equipment such an unloader. A light beam is made to scan up and down toward a ship which is approaching a pier. Among the results of the measurements of distances, the value indicating the shortest distance becomes the distance to the corner part of broadside of the ship. Therefore, the horizontal distance and the vertical distance of the ship with respect to the cargo handling equipment can be computed based on the distance and the up and down angle of the beam. When the cargo handling equipment is controlled with the horizontal distance and the vertical distance as the operating data, the equipment can be operated so that the scraping part at the tip of the cargo handling equipment and the like do not hit the bottom of the ship.

In still a further example U.S. Pat. No. 3,594,716 describes a system where a vessel docking system employs transmitting and receiving transducers for developing Doppler frequency shifted signals indicative of velocity components along particular ship's axes. The signals are converted to digital form, and processed to yield speed and direction information along the sensed axes. The velocity information is corrected to compensate for variations in the acoustical propagating characteristic of the ocean medium.

In still a further example U.S. Pat. No. 3,690,767 describes a docking system for large ocean-going vessels, which comprises a laser pulse range radar system having a laser transmitter and receiver, a retroreflector, and receiving and transmitting optics. Two such systems are disposed on a dock. The retroreflectors are disposed on the bow and stern of a vessel. The laser systems share a time interval meter, a computer, and a display panel. The lasers track the retroreflectors as the ship approaches the dock, and the time interval between the transmitted and received pulses is measured. Computations are made and the velocity of the approaching vessel, its distance from the dock, and the vessel position with reference to the dock are continually displayed. This information is then transmitted to the ship's captain.

In still a further example U.S. Pat. No. 3,707,717 describes a system that has been provided for generating correction command signals relative to the berthing velocity profile of a vehicle in approach of a docking position. A doppler radar system including a radar transceiver projects signals between the docking position and the vehicle and respondingly generates doppler shift frequency signals indicative of the velocity of the vehicle and the relative displacement thereof. A radar counter having preset initial counts stored therein indicative of anticipated initial berthing conditions, responds to the frequency shift signals by counting down from the initial counts in accordance with the doppler shift. Means is included for updating the radar counter in accordance with actual conditions and includes a sonic detector which periodically projects sonic signals between the vehicle and the docking position and respondingly generates corrected count signals in accordance with the reflected sonic energy, indicative of actual distance of the vehicle to the docking position. Means is utilized which periodically transfers the corrected count signals to the radar counter, correcting for errors between actual and preset initial conditions. A velocity profile generator responds to the radar counter output and generates a programmed desired berthing velocity profile which a comparator responds to the velocity profile generator and the counter for generating command signals indicative of any discrepancy between the actual and desired vehicle berthing profile.

In still a further example U.S. Pat. No. 3,754,247 describes a display apparatus which produces a display of a ship, a line representing an intended berth and indicators whose separation from the berth marker line represents the deviation of the closing rate of an associated part of the ship from a value determined by a function generator which generates an optimum function from signals representing the distance of the part of the ship from the berth.

In still a further example U.S. Pat. No. 4,340,936 describes a navigational aid system including a microprocessor having peripheral memory devices and being programmed by a read only memory, the system including sensors for measuring variable parameters and thumb switches for inserting known fixed data, and the microprocessor computing from such parameters and data readout data needed for optimum navigation taking into account such factors as leeway and current set and drift, the system having switches to select which data is displayed as the switches are sequentially polled, and the displayed data being accompanied by alpha indicia uniquely identifying each displayed numeric value.

In still a further example U.S. Pat. No. 5,274,378 describes a relative velocity indicator system for assistance in the docking of vessels uses a radar sensor providing a relative velocity signal indicative of the relative velocity between a ship and a reference, such as a dock. A wireless transmitter associated with the radar sensor receives said relative velocity signal and transmits a signal indicative of said relative velocity signal. A portable receiver and indicator unit carried by the captain of the vessel has a receiver for receiving the transmitted signal and an indicator arranged to receive, from said receiver, a receiver signal indicative of the transmitted signal and, thereby, of the relative velocity signal for indicating the relative velocity between ship and reference.

In still a further example U.S. Pat. No. 5,432,515 describes a docking information system for assistance in the docking of vessels uses sensors providing information indicative of the relationship between a ship and a reference, such as a dock, a coast line, a river bank, docks, bends and docking areas. A computer coordinates the information. A wireless transmitter associated with the computer transmits signals indicative of the information. A portable receiver and indicator carried by the captain of the vessel has a receiver for receiving the transmitted signals and an indicator screen to display the information. The remote receivers also include fixed monitors on the ship and on shore, and telephones on the ship which communicate with the computer and into the telephone link with shore-based communications.

In still a further example U.S. Pat. No. 5,969,665, an improved method and apparatus provide a control of the vessel maneuvering by a determination and displaying of the dangerous relative course zones, wherein the end of the vessel speed-vector should not be located for the object evasion tactic maneuvering and/or collision avoidance maneuvering and should be located for the object pursuit and/or interception tactic maneuvering. The apparatus comprises an object disposition evaluator, a control system, a dangerous criteria setting system, an initial data processor, at least one display and a dangerous relative course zone determiner, including an interface-signal distributor, a logic processor and signal distributor and a data processing system, comprising a trigonometric function processor, a summator, a multiplier-divider and a data processor. The dangerous relative course zones are displayed on at least one indicator, proving the operator with the possibility to evaluate the danger approach situation and instantly select the anti-collision maneuver for collision preventive maneuvering and/or select an optimal maneuver for the assigned vessel tactic maneuvering execution.

In still a further example U.S. Pat. No. 6,677,889, a auto-docking system has been provided that can automatically dock a ship. The auto-docking system provides a close in radar system and a secondary propulsion system that is under control of a docking processor.

In still a further example Japanese Patent Publication No. 60-187873 describes a system to achieve automation and labor saving in the operation necessary for alongside pier of a ship by perform a docking operation based on a video and the distance of a target object obtained with a TV camera and a laser distance measuring device set on the ship. A signal processor processes a video signal of a target object taken with a TV camera and a signal of the distance thereof measured with a laser distance measuring device according to a program previously memorized to analyze the positional relationship between the target object and the ship, which enables as accurate determination of the target object in real time. The signal processor also outputs a docking command based on the positional relationship between the target object and the ship while outputting a signal to operate a mooring device such as a winch.

In still a further example U.S. Pat. No. 4,063,240 describes an electronic docking system utilizing a multiplicity of sensing subsystems to derive and display docking parameters during the docking operation. The parameters displayed include bow and stern velocities ship's velocity perpendicular and parallel to the jetty and ship's orientation to the jetty during the docking maneuver. Parameters are derived from data gathered by sensors that include a receive only monopulse and a receive only doppler system which determine the angular position of a selected reference location aboard the ship and a signal with a frequency representative of the ship's velocity from a signal radiated from a beacon antenna aboard the ship. Range measurements are accomplished by utilizing baseband pulse radar systems capable of determining range to accuracies in the order of one foot. A telemetry link between the ship and the shore based system provides a means for simultaneously displaying data on board and on land and for relaying docking commands from the jetty master to the docking pilot.

It is therefore an object of the present invention to provide a scanning system which overcomes a disadvantage in the prior art or which will at least provide the public with a useful choice.

BRIEF DESCRIPTION OF THE INVENTION

In a first aspect the present invention consists in a profile scanner for locating a target zone on a profile of a vessel comprising:

an emitter adapted to progressively or instantaneously radiate towards said vessel;

a receiver providing a signal indicative of radiation incident thereon;

a controller or processor including stored instructions, for energizing said emitter and receiving said signal, determining the vertical location of a target zone suitable for the engagement of said mooring robot; and locating an associated mooring robot or other vessel anchoring system according to said determined target zone.

Preferably said controller or processor includes stored instructions for locating an attachment pad of a mooring robot according to said determined target zone, said attachment pad being adapted to engage to said target zone.

In a further aspect the present invention consists in a profile scanner as hereinbefore described wherein said emitter is a laser emitter.

In a further aspect the present invention consists in a profile scanner as hereinbefore described wherein said controller receives said signal and converts the polar coordinate data contained therein to rectangular coordinates.

Preferably said rectangular coordinates comprise a cross sectional profile.

Preferably said controller differentiates said rectangular coordinates to determine a derivative profile having edges.

Preferably, the stored instructions are for locating the pad at a target zone on the vessel to avoid any protrusions or openings on said vessel's side.

Preferably said edges are defined as any portion of said derivative profile having a derivative over a predetermined threshold.

Preferably said target zone is between the uppermost edge and any significant intermediate edge.

Preferably said target zone is a predetermined distance from said intermediate edge.

In a further aspect the present invention consists in a profile scanner as hereinbefore described wherein said scanner updates said target zone location periodically.

In a further aspect the present invention consists in a profile scanner as hereinbefore described wherein any one or more selected from the following are also determined from said signal:
  gunwale,
  rubbing strake, and
  tide level.

In a further aspect the present invention consists in a mooring robot mounted to a mooring facility, for mooring a floating vessel adjacent said mooring facility, said mooring robot including;
  a suction pad to locate onto the side of said floating vessel,
  actuators to move said suction pad relative to said mooring facility,
  a profile scanner as claimed in any one of the preceding claims to control said actuators to effect at least a controlled vertical positioning of said suction pad.

In a further aspect the present invention consists in a mooring facility for floating vessels, which includes at least one mooring robot as hereinbefore described.

In a further aspect the present invention consists in a method of mooring a floating vessel adjacent a mooring facility of a kind as hereinbefore described comprising
  operating the profile scanner to scan the hull of a vessel
  allowing any adjustment in the vertical position of said suction pad in response to the profile scanner
  engaging the suction pad to the hull of said vessel
  sucking the suction pad to the hull of said vessel.

Preferably prior to the sucking of said suction pad, the profile scanner also scans the surface of water adjacent said mooring facility to determine the sea state, wherein the sucking of said suction pad is to a minimum suction pressure correlative to the sea state.

Preferably prior to engaging said pad to said hull, the profile scanner also scans the surface of water of a tidal body of water adjacent the mooring facility, to allow determination of the state of the tide of said tidal body of water, wherein the vertical positioning of said suction pad is dependent on the state of the tide.

In a further aspect, the invention may be said to broadly consist in a method of mooring a floating vessel adjacent a mooring facility of a kind as described above, said method comprising the steps of
  energizing an emitter;
  receiving a reflected signal from said emitter
  determining the vertical location of a target zone suitable for the engagement of a mooring robot; and
  locating a mooring robot according to the determined target zone location.

In a further aspect, the invention may be said to broadly consist in a method of mooring a floating vessel adjacent a mooring facility of a kind of the present invention, said method to be carried out under direction of software instructions stored on an electronic system, said method comprising the steps of
  energizing an emitter;
  receiving a reflected signal from said emitter
  determining the vertical location of a target zone suitable for the engagement of a mooring robot; and
  locating a mooring robot according to the determined target zone location.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

The invention consists in the foregoing and also envisages constructions of which the following gives examples only.

BRIEF DESCRIPTION OF THE DRAWINGS

One preferred form of the present invention will now be described with reference to the accompanying drawings in which.

DETAILED DESCRIPTION OF THE INVENTION

The contents of International Patent Application numbers PCT/NZ01/00025, PCT/NZ01/00026, PCT/NZ02/00062, PCT/NZ03/00001 and PCT/NZ03/00167 are incorporated herein by reference.

In one embodiment now described the present invention relates to a device and method of vertically targeting an attachment pad (e.g. the suction force pad) for a mooring robot onto the side of a vessel. Prior art attempts at vertical targeting relate to the use of tide charts and a lookup table which either identifies the vessel or key attributes of the vessel entered by the operator sighting the vessel in question.

Figure 1:
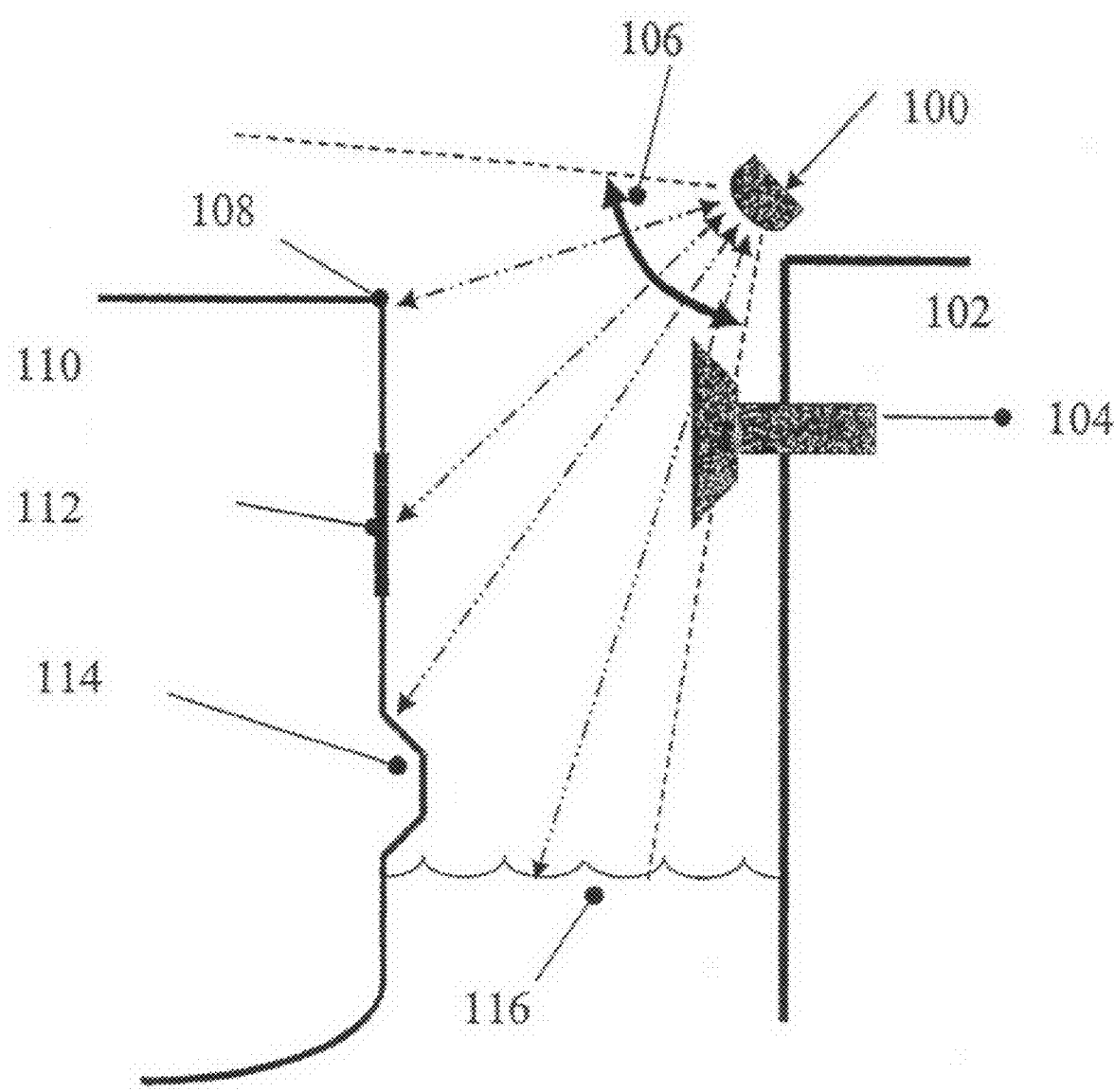
FIG. 1 is a block diagram showing the system component according to one embodiment of the present invention.

When a vessel 110 is alongside the mooring facility such as pier 102 and near stationary, the scanner 100 may be employed to detect where an attachment zone 112 suitable to vertically attach the attachment pad (such as a suction pad) of a mooring robot 104 to the ship's hull exists, as shown in FIG. 1. The scanning occurs prior to the suction pad being attached to the vessel.

This scanning procedure could be carried out using a "Sick" single line laser radar coupled with a PLC based "PC" used to process the data into a usable format for the control program.

The Scanner may sweep the side profile of the hull of a vessel 110 to detect for example:
  Vessel's gunwale 108.
  Target attachment area 112 on the side of the hull.
  Top of the belting or rubbing strake 114.
  Width of the belting or rubbing strake projecting out from the hull.
  Current tide level 106.

With the above information the positional control elements of the mooring robot 104 can be controlled as to enable the positioning of the pad on the vessel at an appropriate location to avoid any protrusions or openings on vessels side.

In addition to this, the Scanner may also provide the following information for any port authority or shipping operator:
  Identification of the actual ship alongside, by comparing it to stored data.
  Act as a tide gauge to provide feedback on the tide levels and any unusual fluctuations thereof caused by for example tidal waves or storm surge.
  Establishing arrival and departure draughts of each ship.

The scanning of tidal height has the benefit of allowing the suction pad to be positioned at a height which is appropriate to the state of the tide. The suction pad mounted from the mooring facility, is usually free running manner in a vertical direction relative to the mooring facility. It may have active control exercised over it in a horizontal plane in order to keep the vessel within a range from a desired location. However free running vertical movement of the suction pad, once attached to the vessel, is required to cater for tidal change and vessel loading changes, which displace the vessel in a vertical direction relative to the mooring facility. The mooring robot will have a limited range or travel of the suction pad in the vertical direction. The suction pad may be mounted on vertical rails which are of a finite length. By determining the state of the tide by the scanner, the position of the suction pad can be controlled, prior to engaging to the vessel to ensure the suction pad is affixed (subject to any detected objects of the hull that may prevent such), to assume a tidal level determined vertical suitable location. For example if the tide is at or near full, the suction pad should be as close as possible (subject to any objects of the hull that may limit such proximity) positioned at or near the upper limit of its travel. A subsequent dropping tide will then allow the suction pad to remain attached for the maximum duration before reaching the lower limit of its travel on its vertical rails.

Scanning of the water may also allow a determination of the sea state. The information gathered of sea state can be used by the device of the present invention to control specify a suitable suction pressure for the suction pad engagement with the vessel. A rough (i.e. choppy) sea state usually correlates to strong winds. This may require the suction pressure to be set at a level suitable to ensure that the vessel remains securely located adjacent the mooring facility by the robot or robots.

The scanning may occur during a period immediately prior to mooring of a vessel taking place or may be ongoing to allow the collection and recording of tidal and sea state data.

Examples of components of the system which may be used to implement the invention will now be described.

1. Hardware

The present invention in one example is integrated into a PLC based control system, including:
Single line laser profile scanner.
PLC "rack" based Multi Vendor Interface (MVI) module.

2. Operation

The scanning system will provide the "pre-stage" position in the vertical axis for the mooring unit.

When a vessel is present and close to being in position to moor the operator will press the "pre-stage" button on a Human Machine Interface (HMI).

When ready the PLC will request data from the scanner. This data will be requested and updated as required by the parameters defined in section 3.

3. Control Parameters

A. Maximum Ship to Berth Distance for "Pre-Stage" (mm)

This parameter is to ensure, that due to the effective range of the scanner, the unit is not looking at the next berth.

B. Minimum Vertical Target Area Height (mm)

This is to ensure that if the ship is rising and falling that the distance between the highest point of any lower disposed obstacles such as the rubbing strake or lowest point of the desirable attachment zone, and the lowest point of the highest desirable attachment point or the top of the attachment area defined by for example the gunwale is large enough for the unit to attach to.

C. Re-Scan Timer (mm)

Once the scanner has been asked to provide the PLC with information it will be asked to rescan to check the data collected based on this timer.

D. Max Height Variation Between Re-Scans (mm)

If the height difference between rescans exceeds this parameter a warning will be posted on the HMI. The operator can accept this new information or cancel it and proceed with the old information.

E. Change Vertical Setpoint if Rescan Variation Exceeds (mm).

If the variation between rescan heights is less than this parameter the unit pre-stage vertical setpoint will not be altered. If the variation is more than this parameter the vertical setpoint will be updated.

4. Data Collection

The scanner 100 is a laser radar based unit that, when requested, may sweep an arc of 100 degrees reporting back via serial communication the angle (on increments of 0.5 degrees) and the distance from the scanner to an object in front of the scanner if less than 80 m.

Software may collect this data to average the distance reading over five scans. The averaged data points may be converted from polar coordinates to rectangular coordinates. An equation (s) for this (these) data points may be differentiated to find the points of "rate of change". The point with the greatest rate of change may be used a datum to reference other such points to determine the location of the required points on the hull with reference to the "zero" datum.

Figure 2:
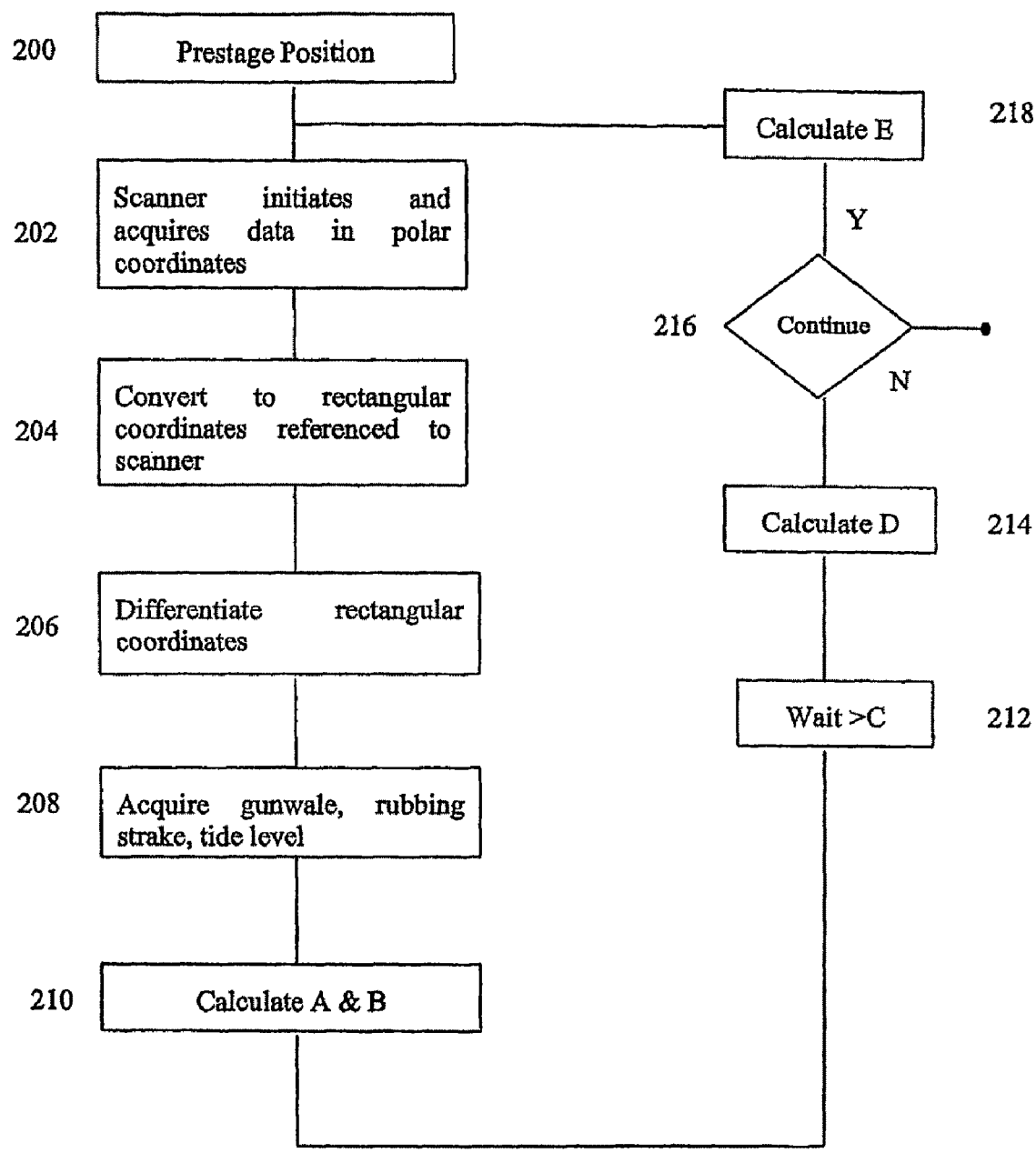
FIG. 2 is a flow diagram of the control logic.

Referring to FIG. 2 the control logic is illustrated starting by selection of a prestige position 200. The scanner initiates and acquires data in polar coordinates 202, followed by conversion to rectangular coordinates referenced to the scanner 204. The rectangular coordinates are differentiated 206, to allow acquisition of gunwale, rubbing strake and tide level 208. Then parameters A and B are calculated 210. The process pauses for period C 212 and calculates parameter D 214. The operator may choose to continue 216, and parameter E is calculated 218 before continuing on the next interaction.

Where reference herein is made to the suction pad of the mooring robot engaging to the hull of the vessel, it is to be appreciated that this is the preferred location point of the suction pad. However other location points such as part of the superstructure or extensions from the hull may also present suitable surfaces for the suction pad to engage for the purposes of mooring the vessel.

The invention claimed is:

1. A profile scanner for locating a target zone on a profile of a vessel suitable for engagement with a mooring robot, said profile scanner comprising:
   an emitter adapted to progressively or instantaneously radiate towards said vessel;
   a receiver providing a signal indicative of radiation incident thereon;
   a controller or processor including stored instructions, for
     (i) energizing said emitter and receiving said signal,
     (ii) determining the vertical location of a target zone suitable for the engagement of the mooring robot, and
     (iii) locating an associated mooring robot or other vessel anchoring system according to said determined target zone location.

2. The profile scanner as claimed in claim 1 wherein said controller or processor includes stored instructions for locating an attachment pad of a mooring robot according to said determined target zone, said attachment pad being adapted to engage to said target zone.

3. The profile scanner as claimed in claim 1 wherein said emitter is a laser emitter.

4. The profile scanner as claimed in claim 1 wherein said controller receives said signal and converts the polar coordinate data contained therein to rectangular coordinates.

5. The profile scanner as claimed in claim 4 wherein said rectangular coordinates comprise a cross sectional profile.

6. The profile scanner as claimed in claim 5 wherein said controller differentiates said rectangular coordinates to determine a derivative profile having edges.

7. The profile scanner as claimed in claim 6 wherein said edges are defined as any portion of said derivative profile having a derivative over a predetermined threshold.

8. The profile scanner as claimed in claim 7 wherein said target zone is between the uppermost edge and any significant intermediate edge.

9. The profile scanner as claimed in claim 7 wherein said target zone is a predetermined distance from said intermediate edge.

10. The profile scanner as claimed in claim 1 wherein said scanner updates said target zone location periodically.

11. The profile scanner as claimed in claim 1 wherein any one or more selected from the following are also determined from said signal:
    gunwale,
    rubbing strake, and
    tide level.

12. The mooring robot mounted to a mooring facility, for mooring a floating vessel adjacent said mooring facility, said mooring robot including;
    a suction pad to locate onto the side of said floating vessel,
    actuators to move said suction pad relative to said mooring facility,
    a profile scanner as claimed in claim 1 to control said actuators to effect at least a controlled vertical positioning of said suction pad.

13. The mooring facility for floating vessels, which includes at least one mooring robot as claimed in claim 12.

14. The method of mooring a floating vessel adjacent a mooring facility of a kind as claimed in claim 13 comprising operating the profile scanner to scan the hull of a vessel;
    allowing any adjustment in the vertical position of said suction pad in response to the profile scanner;
    engaging the suction pad to the hull of said vessel; and
    sucking the suction pad to the hull of said vessel.

15. The method as claimed in claim 14 wherein prior to the sucking of said suction pad, the profile scanner also scans the surface of water adjacent said mooring facility to determine the sea state, wherein the sucking of said suction pad is to a minimum suction pressure correlative to the sea state.

16. The method as claimed in claim 14 wherein prior to engaging said pad to said hull, the profile scanner also scans the surface of water of a tidal body of water adjacent the mooring facility, to allow determination of the state of the tide of said tidal body of water, wherein the vertical positioning of said suction pad is dependent on the state of the tide.

17. A method of mooring a floating vessel adjacent a mooring facility of a kind as claimed in claim 13, said method comprising the steps of
    (a) energizing an emitter;
    (b) receiving a reflected signal from said emitter
    (c) determining the vertical location of a target zone suitable for the engagement of a mooring robot; and
    (d) locating a mooring robot according to the determined target zone location.

18. A method of mooring a floating vessel adjacent a mooring facility of a kind as claimed in claim 13, said method to be carried out under direction of software instructions stored on an electronic system, said method comprising the steps of
    (a) energizing an emitter;
    (b) receiving a reflected signal from said emitter
    (c) determining the vertical location of a target zone suitable for the engagement of a mooring robot; and
    (d) locating a mooring robot according to the determined target zone location.

19. The profile scanner as claimed in claim 1, wherein said stored instructions are for locating the pad at a target zone on the vessel to avoid any protrusions or openings on said vessel's side.

* * * * *